US006407679B1

(12) United States Patent
Evans et al.

(10) Patent No.: US 6,407,679 B1
(45) Date of Patent: Jun. 18, 2002

(54) SYSTEM AND METHOD FOR ENTERING TEXT IN A VIRTUAL ENVIRONMENT

(75) Inventors: Francine Evans, Ozone Park; Steven Skiena, Port Jefferson; Amitabh Varshney, Port Jefferson Station, all of NY (US)

(73) Assignee: The Research Foundation of the State University of New York, Stony Brook, NY (US)

( * ) Notice: Subject to any disclaimer, the term of this patent is extended or adjusted under 35 U.S.C. 154(b) by 0 days.

(21) Appl. No.: 09/364,433

(22) Filed: Jul. 30, 1999

Related U.S. Application Data

(60) Provisional application No. 60/094,910, filed on Jul. 31, 1998.

(51) Int. Cl.[7] .............................................. H03M 11/00
(52) U.S. Cl. ...................... 341/20; 400/475; 400/479.2; 345/702; 345/811; 345/168; 345/773
(58) Field of Search .......................... 341/20; 345/158, 345/156, 168, 701, 702, 773, 825, 811, 705; 400/475, 479.2

(56) References Cited

U.S. PATENT DOCUMENTS

| | | | | | |
|---|---|---|---|---|---|
| 4,414,537 A | * | 11/1983 | Grimes | ......................... | 341/20 |
| 4,849,732 A | * | 7/1989 | Dolenc | ....................... | 200/5 R |
| 4,862,390 A | * | 8/1989 | Weiner | ........................ | 345/168 |
| 4,905,001 A | * | 2/1990 | Penner | ..................... | 340/407.1 |
| 4,988,981 A | * | 1/1991 | Zimmerman et al. | ........ | 345/156 |
| 5,059,252 A | * | 10/1991 | Renfro, Jr. | ................... | 106/900 |
| 5,151,553 A | * | 9/1992 | Suzuki et al. | .................. | 341/20 |
| 5,212,372 A | * | 5/1993 | Quick et al. | ............ | 235/462.44 |
| 5,571,020 A | * | 11/1996 | Troudet | .......................... | 2/160 |
| 5,583,478 A | * | 12/1996 | Renzi | ....................... | 340/407.1 |
| 6,011,554 A | * | 1/2000 | King | ........................... | 345/168 |
| 6,304,840 B1 | * | 10/2001 | Vance et al. | ................... | 341/20 |
| 6,307,548 B1 | * | 10/2001 | Flinchem et al. | ............. | 341/22 |

* cited by examiner

Primary Examiner—Michael Horabik
Assistant Examiner—Albert K. Wong
(74) Attorney, Agent, or Firm—Dilworth & Barrese, LLP

(57) ABSTRACT

A system and method for entering text in a virtual environment by sensory gloves. The user enters a key that represents one or more letters by simulating a press of a keyboard in the gloves. The user calibrates the gloves by entering text, during which time the system establishes threshold values that represent simulated presses for each finger. After the initial calibration of the sensory gloves, the user enters text with simulated finger presses. The system distinguishes which movements are intended as simulated finger presses by examining the relative motions of fingers and maintaining dynamic thresholds. Errors are alleviated by providing feedback to the user, such as beeps and a visual display of the fingers and the current text. Because keys may represent more than one character, the system determines the intended text by probabilistic analysis and the Viterbi algorithm.

12 Claims, 9 Drawing Sheets

| LETTERS | ABCD | EFGH | IJKL | MNOP | QRST | UVWX | YZ | <BACKSPACE> | <SPACE> | <PERIOD> |
|---|---|---|---|---|---|---|---|---|---|---|
| FINGERS | 1 | 2 | 3 | 4 | 5 | 6 | 7 | 8 | 9 | 10 |

| STEP | USER PRESSES FINGER # | SYSTEM STORES FINGER ID'S | SYSTEM DISPLAYS |
|---|---|---|---|
| 1 | 2 | 2 | e |
| 2 | 3 | 23 | hi |
| 3 | 9 | 239 | hi |
| 4 | 4 | 2394 | hi n |
| 5 | 4 | 23944 | hi no |
| 6 | 4 | 239444 | hi mom |
| 7 | 8 | <empty> | hi mom. |

*FIG. 9*

SYSTEM AND METHOD FOR ENTERING TEXT IN A VIRTUAL ENVIRONMENT

PRIORITY

This application makes reference to, incorporates the same herein, and claims all benefits accruing under 35 U.S.C. §119 from an provisional application entitled SYSTEM AND METHOD FOR ENTERING TEXT IN A VIRTUAL WORLD earlier filed in the U.S. Patent Office on Jul. 31, 1998, and there duly assigned Serial No. 60/094,910.

BACKGROUND OF THE INVENTION

1. Field of the Invention

The present invention relates generally to data input in a virtual environment and, more particularly, to inputting words and sentences by means of sensory gloves.

2. Description of the Related Art

A virtual environment is one where the user is placed entirely inside a computer-generated world. This is typically done by means of various types of communication gear attached or strapped to the user's body—for example, goggles to create a visual tableau, earphones to provide an audible counterpart, and other instruments that generate sensory input for the user. In order to immerse the user in a virtual world, this gear serves two functions: one is to provide sensory input to the user, the other is to provide the virtual world system with information about the user. For instance, headgear will tell the system the direction of the user's view and sensory gloves will tell the relative locations of the hands and fingers of the user.

In the virtual environment, traditional means of inputting data to the system are neither available nor practical. Because a keyboard cannot be easily attached to the human body, the user usually has to leave the virtual environment in order to enter text data. This inability to enter key data such as text in a virtual environment will become more problematic over time, as the potential of virtual world representations of complex file systems, flowcharts, architectural drawings, and event simulations are realized.

Therefore, other means of text input need to be created for virtual environments. While there are many possible solutions to this problem, including speech recognition, some type of hand or finger manipulation seems to be the most intuitive way to enter text.

Sensory gloves have been considered as appropriate instruments of such text entry. Grimes, U.S. Pat. No. 4,414,537, discloses a glove with sensors positioned to detect joint angles and positions of each finger and further discloses using such a glove to replace a keyboard. However, Grimes' user must learn a new set of static gestures to specify letters. Although Grimes discloses entering data into a virtual world system using sensory gloves, the user must learn new skills that are not intuitive or obvious.

Zimmerman et al., U.S. Pat. No. 4,988,981, discloses sensory gloves that could be used to manipulate objects in a virtual world, such as moving a cursor or performing operations based on gesture and position of the user's hands. The virtual object to be manipulated in Zimmerman et al. could be a representation of an input device such as a keyboard.

There are severe limitations on the prior art use of sensory gloves for key input. A first problem involves the ability to recognize when a simulated finger press is being made. Sensory gloves are typically used to recognize only coarse hand gestures, such as select, grasp, and drop, not the fine gestures needed to differentiate individual finger movements. When fingers are used to represent individual keys, low-cost low-resolution sensory gloves present several problems. Correlated finger movements called sympathetic finger movements, which occur when one finger is pressed down to input a key and the neighboring finger moves a certain distance along with it, create confusing data. For example, FIG. 2A illustrates what happens as a person simulates a press of the pinkie finger. As the pinkie finger presses down (indicated by the peak labeled A), the ring finger (line B) parallels the movement. If the ring finger has a lower threshold (value at which the system determines there has been a simulated press) than the pinkie, the system may determine that the ring finger was the one being pressed.

The phenomenon of finger amplitude variation is also a problem. Two different users may use differing amounts of movement to indicate a finger press. In addition, over time a single user varies the amount of movement to indicate a press. For example, FIG. 2B shows the same intended pinkie press as FIG. 2A, but made ten minutes later. Although the user started by using a right-hand index finger press value of 130 in FIG. 2A, the user is only using a value of 55 when making the same finger press in FIG. 2B.

Lastly, the measurement of finger movements is inherently noisy, which causes false peaks. More exactly, sympathetic finger motions, minor motions caused by shaking hands, and glove output noise produce jagged curves in the finger motion data, as shown in FIG. 2C. These jagged curves can lead the system to both missing presses and recognizing unintended ones.

A second problem is caused by the fact we are limited to ten fingers, but we use a 26-letter alphabet with punctuation symbols. If every finger of the sensory gloves is used to represent an individual key, it would not be possible to represent an entire alphanumeric keyboard by single key entry. It would be possible to use combinations of individual keystrokes to represent each alphanumeric character, but such a procedure would be burdensome.

One solution to this problem is to use an overloaded keyboard, whereby each key, or finger, would represent several different alphanumeric characters. Such a keyboard layout is shown in FIG. 1, where multiple letters are mapped to certain fingers. The left-hand ring finger, for example, could represent "s", "v", and "x", the right-hand index finger could represent "j", "u," "y", "h" and "n", and so on for each finger. This presents a new difficulty: how will the virtual system be able to tell which alphanumeric character was intended, out of the multiple characters that one key input represents?

This character ambiguity can be resolved by exploiting the statistical and grammatical constraints of language in order to reconstruct the text. This process of disambiguation uses probabilistic analysis and a dictionary. There have been various approaches to this overloaded keyboard problem in the field of text entry. One method decodes the text word-by-word using a weighted tree structure called a "Probabilistic History Tree" (See, Litvak and Shamir, *Efficient algorithms for constructing and employing variable-length Markov models of language,* Technical Report, Dept. of Computer Science, Tel-Aviv University, Israel, 1996). Another method, which has also been applied to handwriting recognition, decodes the text sentence-by-sentence using a hash table (See, H. Rau and S. Skiena, *Dialing for documents: An experiment in information theory,* Journal of Visual Languages and Computing, pages 79–95, 1996). But all of these methods were directed towards the overloaded alphabetic keyboard of a telephone keypad.

Therefore, a need exists for a method and system that can reconstruct text from ambiguous characters, as well as reliably recognize the fine movements that represent presses using low-cost, low-resolution sensory gloves.

SUMMARY OF THE INVENTION

It is therefore an object of the present invention to provide a system and method of recognizing fine finger movements, such as key entry on a virtual keyboard, using low-cost, low-resolution sensory gloves. In particular, the system and method solves the problem of sympathetic finger movements by examining the relative motions of neighboring fingers. The system and method also solves the problem of finger amplitude variation by performing an initial calibration, providing the user with visual and aural feedback, and using dynamic thresholds to evaluate the finger movements. Lastly, the system and method eliminates the inherent noise in the finger movement data by using a low-pass Gaussian filter.

It is another object of the present invention to provide a system and method of resolving ambiguous characters entered on an overloaded keyboard. This ambiguous character resolution, or reconstruction, is performed by recognizing blank characters, thus separating out words as key sequences; matching each key sequence with one or more words in a dictionary; constructing or partially matching the words with no dictionary match; generating all possible partial sentences from the possible words; and then determining the most likely partial sentence by assigning probabilities to each possible partial sentence.

The present invention builds on the idea that sensory gloves can be used to create a virtual keyboard, where finger movements can be translated into key entry by a virtual world system. In the exemplary embodiment, the user does not actually see a simulated keyboard in the video goggles, but is shown which fingers represent which letters and when the system recognizes a finger press as text input. In the following text, the term "press" is used to describe a finger motion that is mimicking a finger press on a keyboard, and is intended by the user to indicate that the key represented by that finger has been pressed. The terms "keyboard layout" refers to how the alphanumeric characters are assigned to each finger and "keyboard" to the system by which the sensory gloves are manipulated to represent alphanumeric characters.

BRIEF DESCRIPTION OF THE DRAWINGS

FIG. 9 is a chart illustrating an example of how a word might be reconstructed in accordance with the present invention.

DETAILED DESCRIPTION OF THE INVENTION

The present invention allows low-cost, low-resolution sensory gloves to be used in the system and method. In the preferred embodiment, the $5^{th}$ Glove manufactured by the General Reality Company is used. In these gloves, each finger has only one sensor giving its angular position, consisting of a fully enclosed fiber optic bend sensor. Each finger is sampled at a rate of 200 Hz, producing an 8-bit sample that describes one of 256 possible positions per finger.

A computer system is used to create the virtual environment. In the preferred embodiment, a Pentium Pro™ PC with 512 MB of memory is used. In addition, some manner of visualizing a virtual environment is required, such as goggles. The preferred method provides a display window which shows the positions of all the fingers, indicating by both color and orientation which finger has been pressed, as well as a text window showing what words the system has reconstructed from the finger presses. In the following description, the system and method is broken down into two sections, Finger Press Recognition and Reconstruction Engine. After those sections, an example is given.

A. Finger Press Recognition

Figure 3:
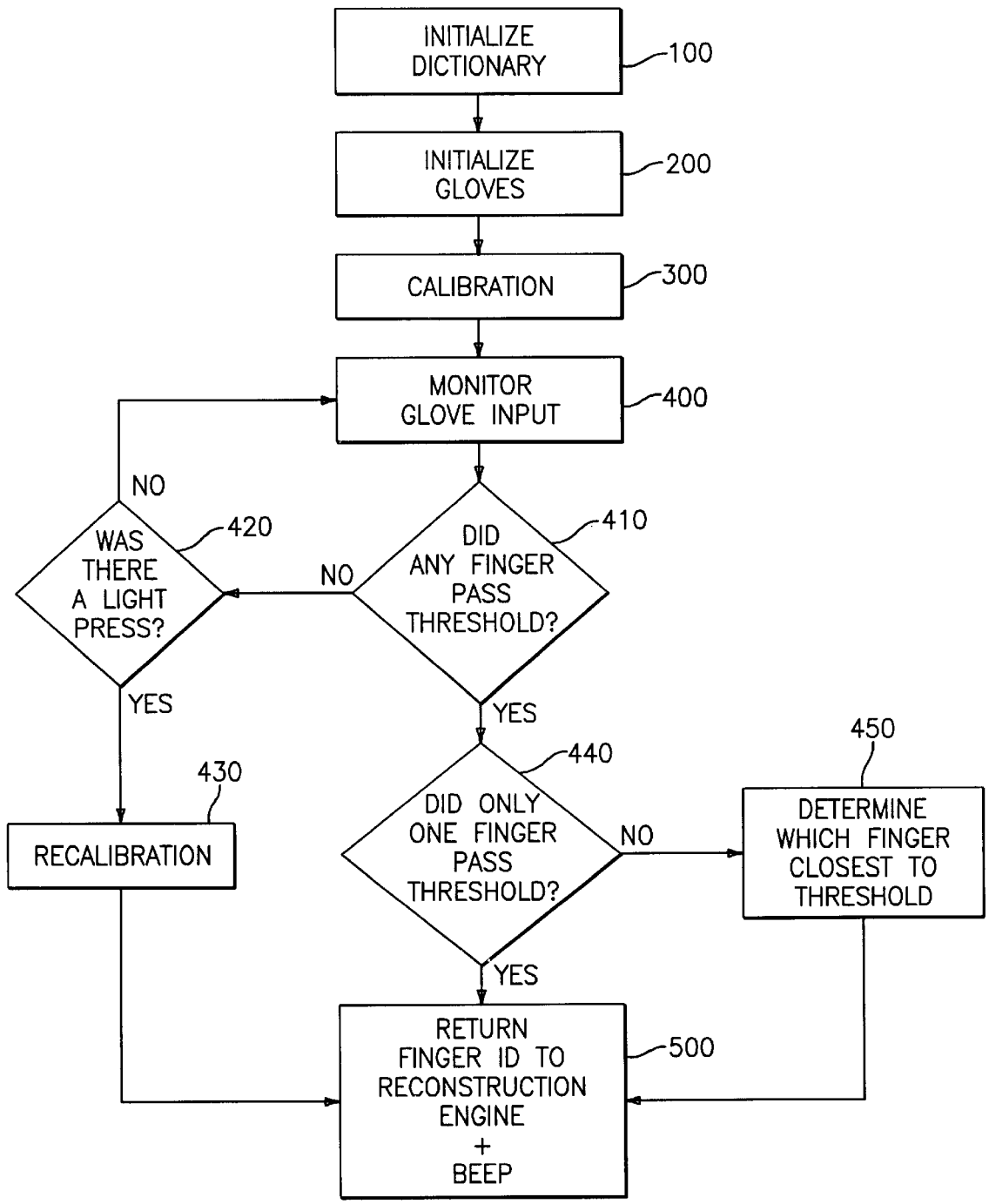
FIG. 3 is an overall flowchart of the finger press recognition portion of the text entry process in accordance with the present invention.

As shown in FIG. 3, the text entry procedure starts with initializing the dictionary at step 100. In the preferred embodiment, the dictionary was built from the UNIX word list, enhanced by other common words. The dictionary, which should contain at least the commonly used words, has a frequency count associated with each word. The dictionary is designed as a balance between including as many words as possible, which may result in frequent collisions between word possibilities, and only including the most common words, which may result in unrecognized words.

Figure 4:
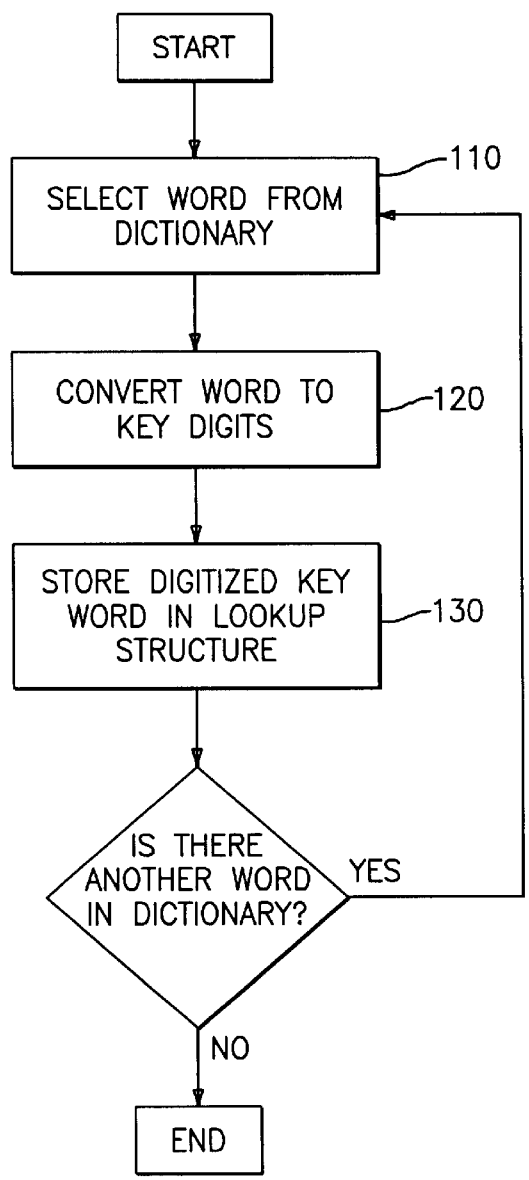
FIG. 4 is a detailed sub-flowchart of the INITIALIZE DICTIONARY step 100 from FIG. 3.

Initializing step 100 is further described in detail in FIG. 4, where a word is selected from the dictionary (step 110), and then that word is converted into its key digit equivalent (step 120). For example, the word "cat" might become "228," if the letters "c" and "a" were both overloaded on the finger labeled key 2, and the letter "t" was on the finger labeled key 8. Then, at step 130, the digitized key word is stored in data lookup structure such as a trie (a digital search tree). The preferred embodiment uses a trie, a digital search tree, rather than other structures such as a hash table as the main dictionary data structure. By doing a depth-first traversal of the appropriate portion of the trie data structure, all dictionary strings that partially match a query string can be efficiently retrieved. Hash tables, which are used in the prior art, cannot efficiently support such queries without hashing multiple copies of each string, which requires a prohibitive amount of space. Further, there is data that suggests the trie structures can be built roughly four times faster than an analogous hash table (Francine Evans, *Efficient Interaction Techniques in Virtual Environments,* Dissertation, Dept. of Computer Science, State University of New York at Stony Brook, 1998).

After storing that word in the data structure, the process loops back to select another word. This process continues until all the words have been placed in the data structure.

Figure 5:
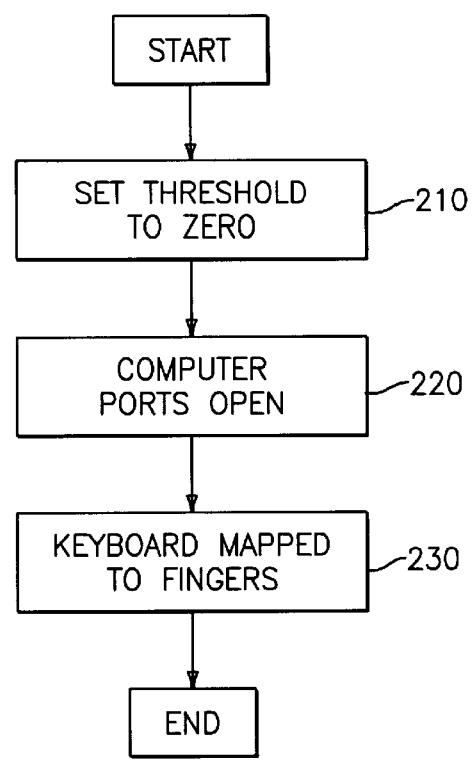
FIG. 5 is a detailed sub-flowchart of the INITIALIZE GLOVE step 200 from FIG. 3.

Once the dictionary has been initialized, the gloves are initialized at step 200 in FIG. 3. As shown in FIG. 5, this initialization starts by setting the threshold value of each finger to zero (step 210). At step 220 in FIG. 5, the ports of the computer are opened so the computer can read the data from the sensory gloves. Finally, at step 230, the specified keyboard is mapped to the fingers. In the preferred embodiment of the invention, the user specifies his or her own keyboard layout. Although the user is forced to overload some fingers with multiple symbols, the user may decide to load the same symbol on multiple fingers, such as a space on both thumbs. There are many possible ways of choosing the keyboard layout. The results of experiment suggest that at least 6 keys or fingers be used to map the entire alphabet (Francine Evans, *Efficient Interaction Techniques in Virtual Environments*, Dissertation, Dept. of Computer Science, State University of New York at Stony Brook, 1998). Consecutive letters may be placed on successive keys or fingers, in the same manner as telephone keypads, which have three letters per numeral. With the idea that reconstructing text is the end result of this system, a keyboard could be laid out so that each individual finger is pressed with the same frequency. The principles of information theory suggest that such an equal frequency layout should lead to greater reconstruction accuracy. The keyboard could also mimic the traditional QWERTY layout of most keyboards or use ergonomic principles to create a minimum-motion keyboard.

Figure 6:
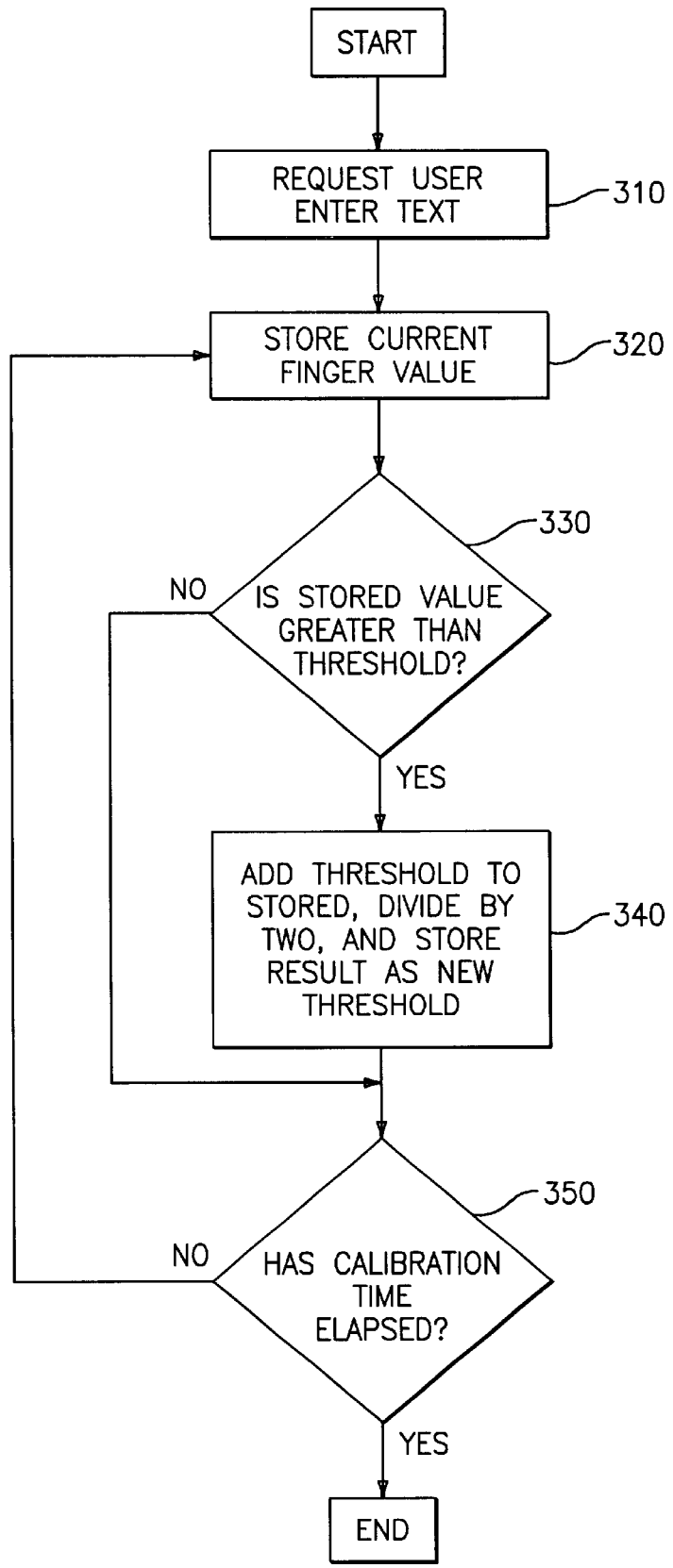
FIG. 6 is a detailed sub-flowchart of the CALIBRATION STAGE step 300 from FIG. 3.

After the gloves are initialized, they are calibrated (step 300 in FIG. 3). The process of calibration helps to eliminate the problems associated with finger amplitude variation. As shown in FIG. 6, the calibration starts with the computer requesting the user to enter some text (step 310). While the user is entering the text, the computer is monitoring all of the fingers through its ports, and performing a checking loop on each one. In that loop, the computer first stores the current finger value (step 320) and then it compares the stored value with the threshold value of that finger (step 330). If the stored value is greater than the threshold value, the computer adds the threshold value to the stored value, divides that sum by two, and stores the result as the new threshold value (step 340). After step 340 or, if the stored value was less than the threshold value in step 330, the computer checks to see if the calibration time period has elapsed (step 350). If it has, that ends the calibration sequence. If not, the computer goes through the checking loop on the next finger.

Figure 2B:
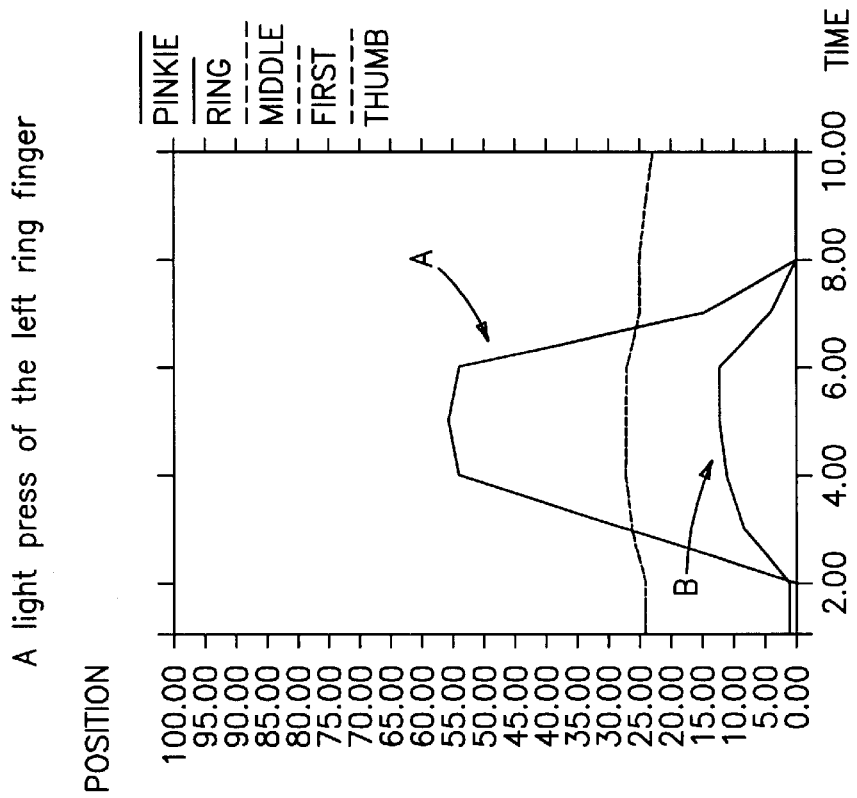
FIGS. 2A, 2B, 2C, and 2D are graphs of glove output over time.
Figure 2A:
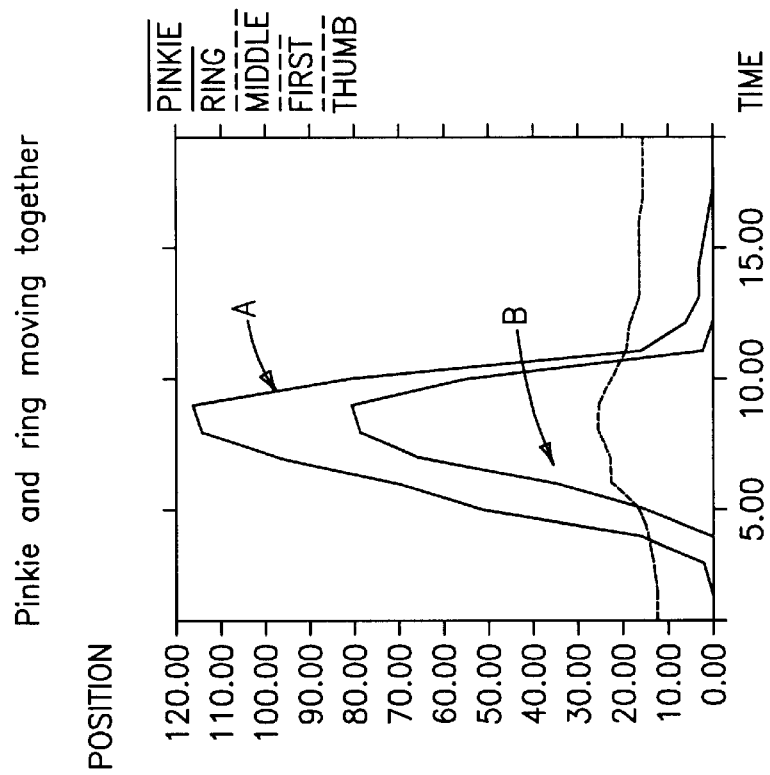
Figure 2D:
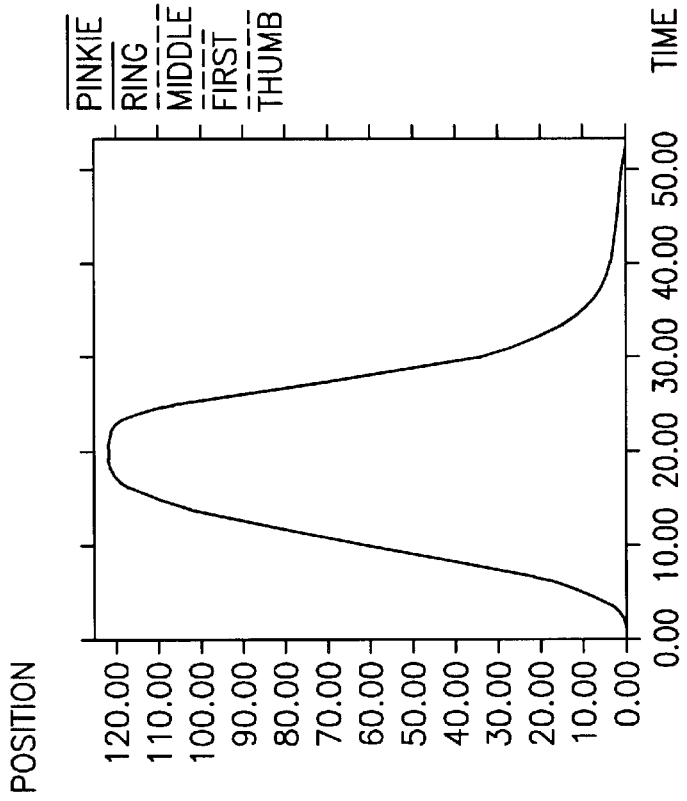
Figure 2C:
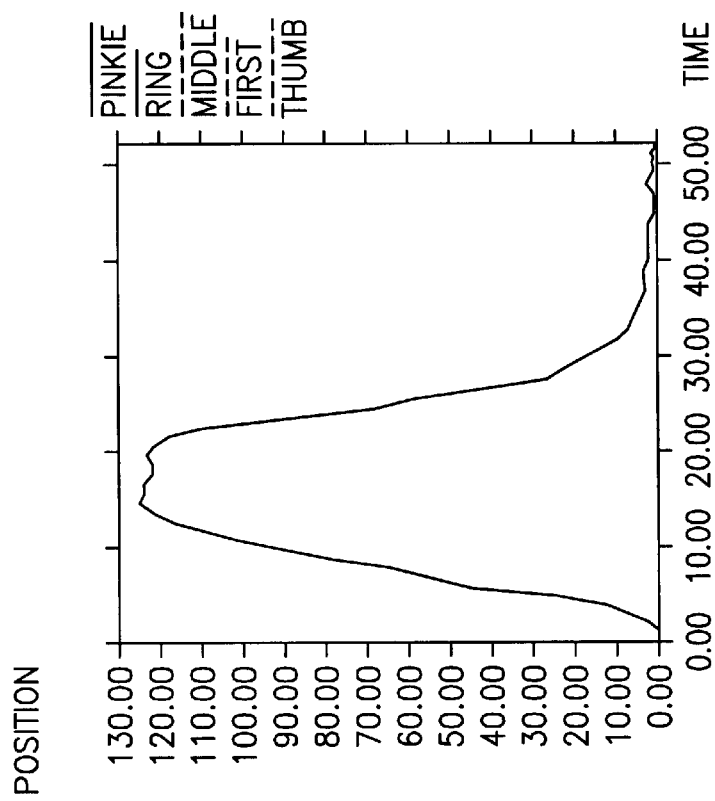

After the calibration sequence, the computer is ready to take text entry from the user. In step 400, the computer monitors the sensory gloves by checking the data from the ports connected to each finger. In the preferred embodiment, this data is pre-processed by a Gaussian low-pass filter in order to remove noise. Noise, such as sympathetic finger motions, minor motions caused by shaking hands, and glove output noise, produce jagged curves in the finger motion data, as shown in FIG. 2C. In the prior art, jagged curves can lead to missing presses and recognizing unintended ones. As shown in FIG. 2D, the addition of a low-pass filter eliminates the jagged variations caused by noise, thereby alleviating the problem.

When monitoring, the computer first checks if any of the finger presses has passed their individual threshold values in step 410. If not, the computer then checks to see if there was a light press in step 420. As discussed above, light presses may occur as the user tires over time and uses less finger movement to indicate a press. The computer checks by taking all current finger values and comparing each one to their threshold value minus a constant value. This constant can be specified beforehand. If the current value of one or more fingers is greater than or equal to the threshold value minus the constant value, there has been a light press. If the current value is not greater than or equal to the threshold value minus the constant, the computer loops back to step 400.

The finger with the light press is recalibrated in step 430. If more than one finger has a light press, the system chooses the finger with the value closest to the threshold and sends it to the recalibration step 430.

The recalibration step 430 consists of replacing the threshold value with the threshold value minus the constant. This makes the thresholds dynamic, successfully alleviating the finger amplitude problem when a user tires over time. In addition, since the new threshold value is the old threshold value minus the constant, the system can recalibrate incrementally rather than with abrupt changes in threshold values.

Once the threshold is recalibrated, the computer returns the appropriate finger ID or key (e.g., 1=left-hand pinkie, 2=left-hand ring finger, and so on) to the reconstruction engine and generates audio/visual feedback to inform the user that a finger press has been entered (step 500). This feedback is helpful in alleviating the finger amplitude problem, because the user will recognize whether the system has registered a finger press. Preferably, the feedback is a soft beep combined with changes in the visual diagram of both hands that is displayed in the user's goggles. In the preferred embodiment, the finger in the diagram representing the one that is pressed changes color and moves to simulate the pressing movement.

Referring back to step 410, if one of the finger values passes the threshold value, the computer determines at step 440 whether only one finger passed its threshold value. If only one finger did, the computer passes the finger ID or key to the reconstruction engine and generates a beep in step 500. If more than one finger has passed the threshold value, the computer determines which current finger value is closest to its threshold at step 450. This step eliminates the sympathetic finger movement problem by analyzing all the fingers in relation to their thresholds before determining which finger press was intended.

The finger ID or key determined in step 450 is passed on to the reconstruction engine and the system generates a beep in step 500. The details of the reconstruction engine will be described below.

B. Reconstruction Engine

Figure 1:
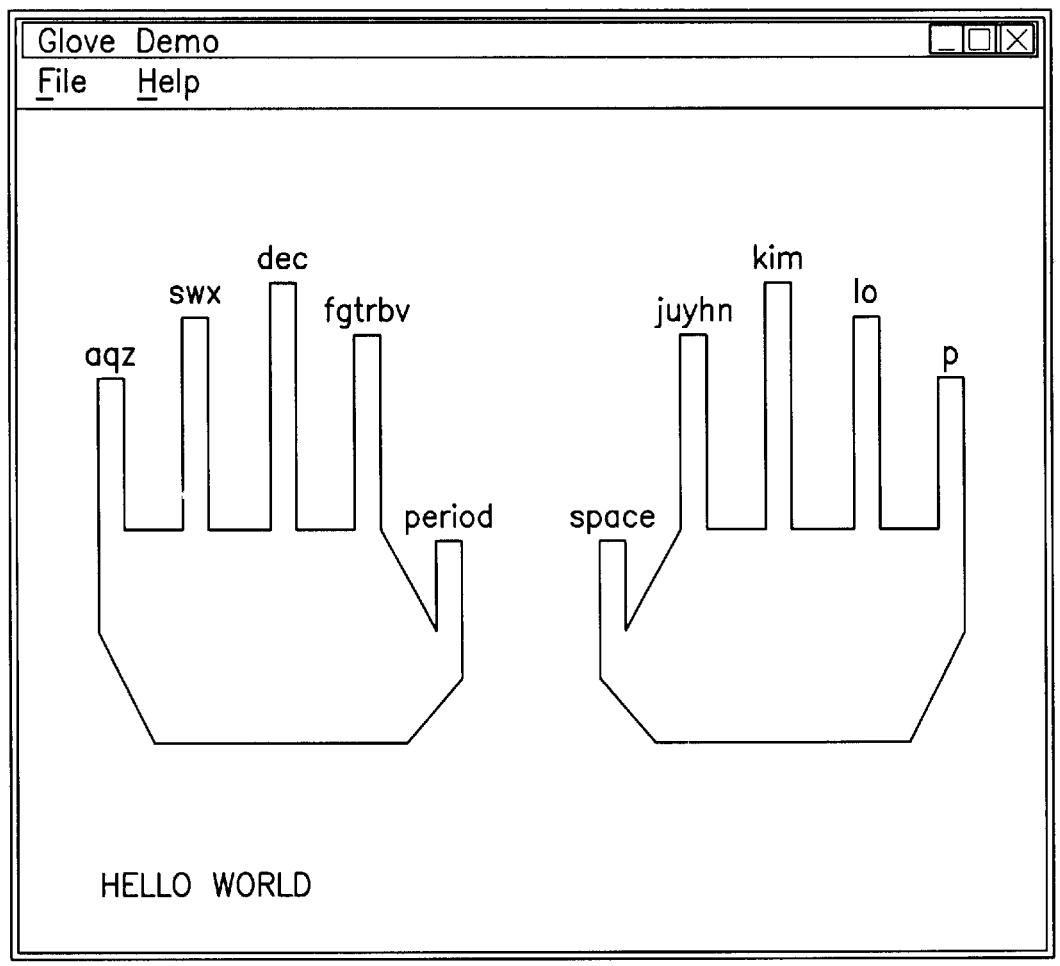
FIG. 1 is an example of a keyboard layout on the fingers of a pair of sensory gloves.
Figure 7:
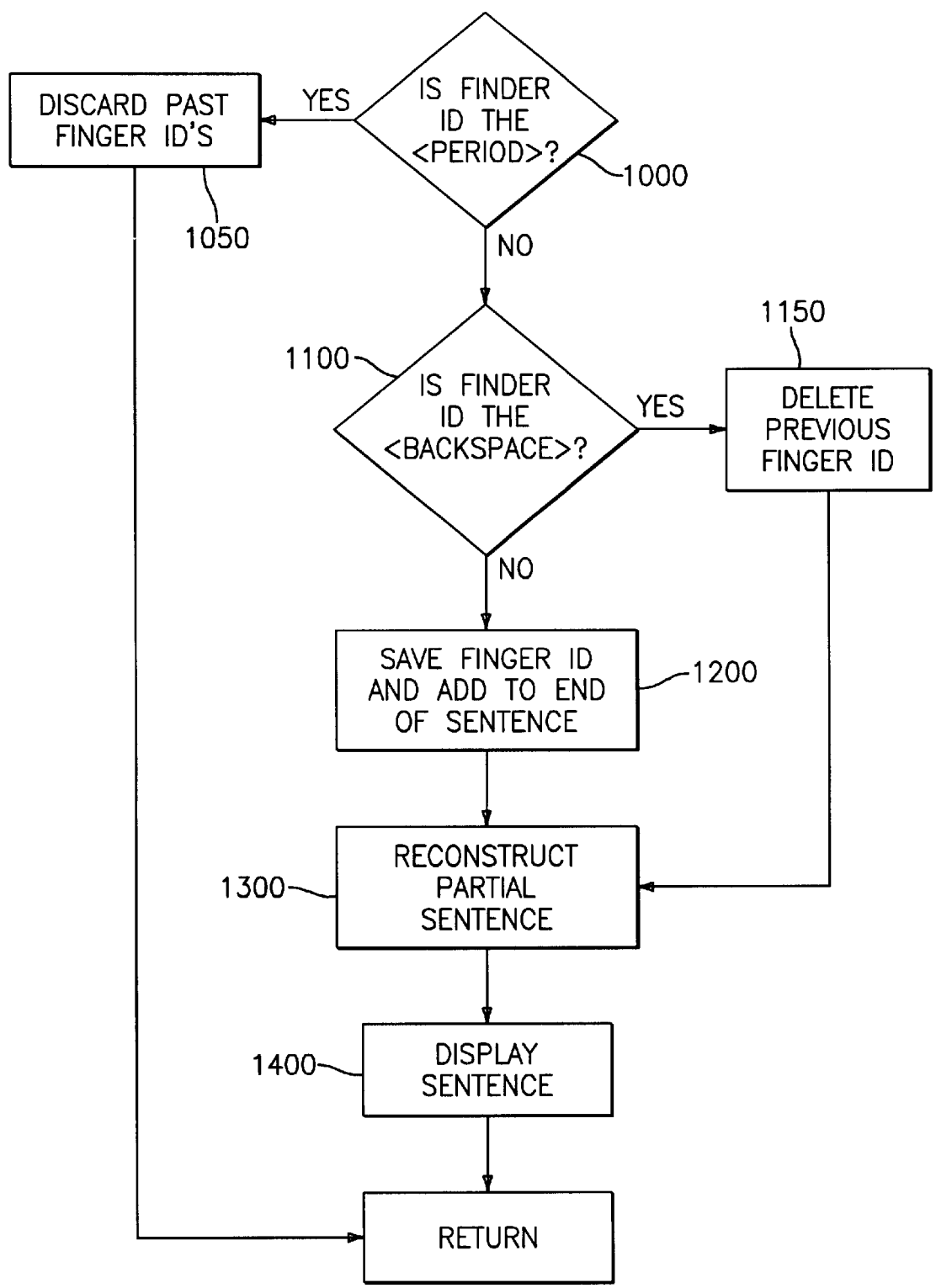
FIG. 7 is an overall flowchart of the reconstruction engine portion of the text entry process in accordance with the present invention.

From step 500 in FIG. 3, the procedure continues at step 1000 in FIG. 7. At step 1000, the computer checks if the finger pressed was the <period> (the left thumb in FIG. 1 and finger ID or key 4). If the <period> was pressed, the computer discards the past finger IDs or keys at step 1050. This effectively erases the sentence from memory so that the system is ready to start a new sentence. After the finger IDs are discarded, the computer returns to monitor for the next finger press (step 400 in FIG. 3).

If the <period> was not pressed in step 1000, the computer then checks if a <backspace> was entered at step 1100. The <backspace> can be represented by more than one finger press—for instance, an embodiment may use two consecutive left thumb presses to be a <backspace>. This requires adding an extra loop that checks for two consecutive left thumb presses. If a <backspace> was entered, the computer deletes the last finger ID or key from memory (step 1150). After step 1150, the computer reconstructs the partial sentence in step 1300. If the press was not a <backspace> in step 100, the computer saves the finger ID and adds it to however much of the sentence exists at this time (step 1200). At this point, the computer reconstructs the partial sentence at step 1300.

After the partial sentence reconstruction (which will be described below) at step 1300, the computer displays the sentence at step 1400, and returns to step 400 in FIG. 3 in order to monitor for more finger presses.

Figure 8:
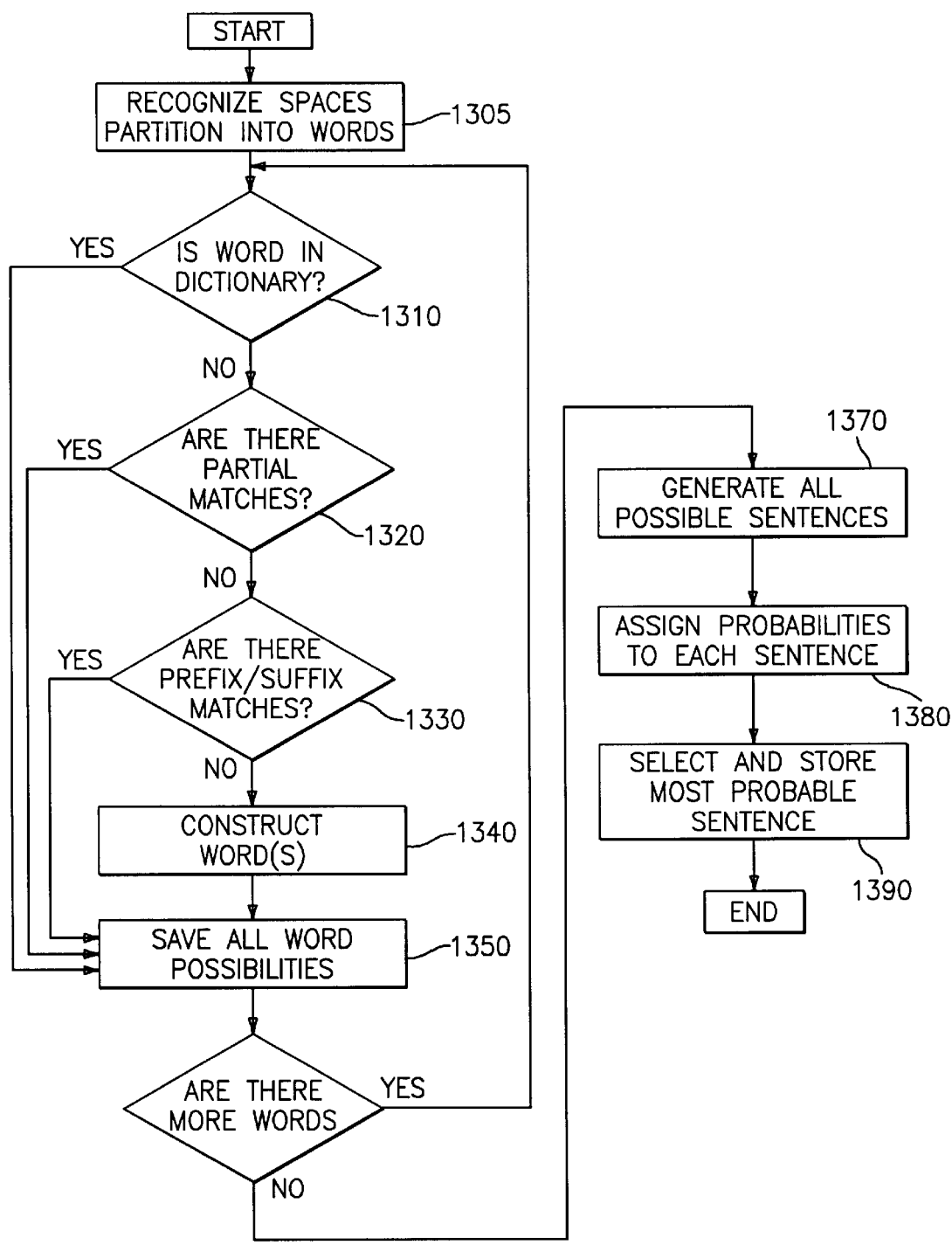
FIG. 8 is a detailed sub-flowchart of the RECONSTRUCT PARTIAL SENTENCE step 1300 from FIG. 7.

The partial sentence reconstruction at step 1300 is broken down in FIG. 8. First, the system recognizes spaces, and partitions the sentence into words at step 1305. As an example, the input at this point might be "585_341_69" (the underscores represent spaces), so the computer would break this down into "585", "341", and "69". Then, at step 1310, the computer takes the first word ("585") and searches the dictionary data structure for that sequence. For "585," the dictionary might contain "RAT", "TAT," "TAR," "RAG," "FAT," "FAR," "FAG," "VAT," "TAG," "TAB," "BAR," "BAG," "GAG," "GAB," and "BAT." If an entry is found in the dictionary, the different word options are saved in step 1350.

If there is no dictionary match, the computer checks to see if there are partial matches in step 1320. If one or more partial matches are found, the computer saves these different word options in step 1350. If not, the computer checks to see if there is a prefix/suffix match in step 1330. If there are prefix/suffix matches, the computer saves them all in step 1350. If there are no prefix/suffix matches, the computer constructs one or more words using character probabilities combined with letter transition probabilities in step 1340. Once constructed, these one or more word options are saved in step 1350.

After step 1350, the computer checks if there are more key sequences to be matched. If there are, the computer starts at 1310 again. If there are no more, the computer has reached the end of the partial sentence and will now analyze it as a whole in order to find the most accurate reconstruction. At step 1370, the computer generates all possible combinations of word options; in other words, every possible sentence.

In step 1380, the computer uses the Viterbi algorithm to find the probability attached to each possible sentence. Grammatical constraints and word pair frequency are employed within the Viterbi algorithm to find the most likely sentence. These constraints can be formulated in terms of transition probabilities:

$P(Z_i/X_i)$, the probability that the word $Z_i$ was intended when the code $X_i$ was observed.

$P(Z_i/Z_{i-1})$, the transitional probability that the word $Z_i$ is observed when the previous word was $Z_{i-1}$.

A directed graph represents the word lattice that forms a set of sentence candidates. Each of the nodes and edges have costs assigned to them. The node costs are the word probabilities for the observed code, while the edge costs are the transition probabilities between word pairs. Any path between the start and end node represents a possible sentence. The Viterbi algorithm finds the maximum-cost path in the trellis using dynamic programming. To ensure that implausible sentences are rejected, each word in the dictionary is augmented with a tag that indicates the corresponding grammatical category.

Once probabilities are assigned to every possible sentence, the computer selects the most probable sentence and stores it at step 1390. At this point, the computer returns to step 1400 in FIG. 7 and provides feedback about the reconstructed sentence. In the preferred embodiment, the reconstructed sentence is shown in the user's visual display. But more sophisticated feedback, such as text-to-speech, could be used.

C. The User's View

In order to give a clearer idea of what the user sees in the preferred embodiment of the present invention, FIG. 9 gives an example of what a user might see during a series of finger presses. The letters of the alphabet have been mapped consecutively to the fingers, which are numbered 1 through 10. The <space> is mapped to finger 9, and the <period> to finger 10.

The user starts by pressing the finger labeled 2, which could indicate the letters "e," "f," "g," or "h." The system runs through steps 400 to 1400 and displays the letter "e." This means that the system has determined that the most probable letter of the group is "e." At step 2, the user presses finger 3, which could indicate the letters "i," "j," "k," or "l." After running through steps 400 through 1400, the system determines the most likely word is "hi" and displays it. As shown in FIG. 9, this process continues as the user presses the fingers labeled 9, 4, 4, and 8. The computer saves the original key sequence ("23944" at step 5) so that each reconstruction iteration will provide the most likely partial sentence. Finally, at step 7, the user presses finger 10, which represents the <period>. This ends the sentence, which the computer has determined is "hi mom," so the computer erases the key sequence "239448" from the memory (step 1050 in FIG. 7) and saves the sentence "hi mom" for display and/or later storage.

The reconstruction engine used above can be used for other applications where there are obscured or ambiguous characters. Conventional handwriting recognition systems and Optical Character Recognition (OCR) systems often report obscured characters as "unknown" or they use reconstruction that is limited to dictionary lookups and character trigram frequencies. The present invention's reconstruction engine, which uses context and grammatical constraints, could increase the recognition rates and decrease the error rates of such devices. In addition, any keyboard system that uses overloaded keys would benefit from the character disambiguation the above system provides.

Text entry for languages with thousands of symbols, such as Chinese, could also be done using this system. The conventional text entry method for Chinese has the user type in the phonetic pronunciation of each character, and then the user selects the appropriate character from a menu based on the phonetic entry. The present invention could perform the selection process automatically.

Although the above embodiment uses sensory gloves, other devices could be used to monitor finger movement, such as cameras, rings, etc.

Although the feedback listed above is auditory and visual, the feedback could also be tactile.

Computer code modules for executing parts of the present invention are provided as appendices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Appendix A

This is the file that calls the reconstruction code and then prints out the reconstructed sentence.

```c
#include "stdafx.h"

ifdef _DEBUG
#define new DEBUG_NEW
#undef THIS_FILE
static char THIS_FILE[] = __FILE__;
endif include <stdio.h>
include <stdlib.h>
#include <string.h>
#include "defines.h"
#include "cnt.h"
#include "hash.h"
#include "word_viterbi.h"
#include "asterisk.h"
#include "viterbi.h"
#include "interface.h"

extern int phone;
extern int read_from_file;

void oldmain(int argc, char **argv) {
  char *Sentence;
  char phonecodes[LONGEST_SENTENCE]; /*phone code string buffer*/ char *reconstruct(internals *stuff, char *phone,int length);
/*typecast for reconstruct routine*/
  char *readcodes(char *phonecodes); /*typecast for input routine*/ int p=0,count = 0,words = 0,ch = 0;

initialize(&stuff);

//here is where we start the glove code
  while ((readcodes(phonecodes)) != NULL) {
    Sentence = reconstruct(&stuff, phonecodes, strlen(phonecodes));
```

```c
        printf("%s.\n",Sentence);
        free(Sentence);
   }
}

/*     Given an input string, test whether it is all digits and symbols.
*/

BOOL isdigitstring(char *str)
{
      while (*str != '\0') {
            if (*str < '2' || *str > '9')
                  if ((*str != '*') && (*str != '#')) return(FALSE);
            str++;
      }
      return(TRUE);
}

/* Read a line of input and return a string of codes.
Also modifies phonecodes. */ char *readcodes(char *phonecodes)
{
char *tmp; /*placeholder for converted string*/
char *stringtodial(char *c);
char c;

printf("> ");

tmp = phonecodes;
c = getchar();
while (c != '\n') {
*(tmp++) = c;
c = getchar();
};
*tmp = '\0';

if (strlen(phonecodes) == 0)
return NULL;
else
if (!isdigitstring(phonecodes)) {
/* using the first repeat of a letter that was specified
*/
tmp = stringtodial(phonecodes);
if (phone == FALSE)
{
while(*tmp == '*') tmp++;
}
printf("%s\n",tmp);
strcpy(phonecodes,tmp);
```

```
sstfree(tmp);
};

return(phonecodes);
}
```

Page 1 of 3

APPENDIX B initializations for the glove

```
// GloveDemo.cpp : Defines the class behaviors for the application.
// include "stdafx.h"
include "GloveDemo.h"
#include "GloveDemoDlg.h"
#include "GloveDriver.h"

//predictor includes
#include "globals.h"
#include "finger.h"

//resolver includes
#include "defines.h"
#include "cnt.h"
#include "hash.h"
#include "word_viterbi.h"
#include "asterisk.h"
#include "viterbi.h"
#include "interface.h"
#include "externs.h"

#ifdef _DEBUG
#define new DEBUG_NEW
#undef THIS_FILE
static char THIS_FILE[] = __FILE__;
endif //history of finger movements
struct FINGER_DATA finger_data[NFINGERS];
struct internals stuff;
extern int backspace;
extern double
rfirst,rmiddle,rring,rpinkie,rthumb,lfirst,lmiddle,lring,lpinkie,lthumb;
extern double saved_all[10][1000000];
extern int sa;

/////////////////////////////////////////////////////////////////////
// CGloveDemoApp BEGIN_MESSAGE_MAP(CGloveDemoApp, CWinApp)
//{{AFX_MSG_MAP(CGloveDemoApp)
// NOTE - the ClassWizard will add and remove mapping macros
here.
```

```
//   DO NOT EDIT what you see in these blocks of generated
code!
//}}AFX_MSG
ON_COMMAND(ID_HELP, CWinApp::OnHelp)
END_MESSAGE_MAP()

/////////////////////////////////////////////////////////////////
// CGloveDemoApp construction CGloveDemoApp::CGloveDemoApp()
{
}

/////////////////////////////////////////////////////////////////
// The one and only CGloveDemoApp object CGloveDemoApp theApp;

/////////////////////////////////////////////////////////////////
// CGloveDemoApp initialization BOOL CGloveDemoApp::InitInstance()
{

//initialize the fingers
init_finger_data(finger_data);

//read in the dictionaries
initialize(&stuff);

if (!GloveInit1("COM1")) {
AfxMessageBox("Unable to initialise glove on Com 1\n");
return FALSE;
} if (!GloveInit2("COM2")) {
AfxMessageBox("Unable to initialise glove on Com 2\n");
return FALSE;
}

// Standard initialization
// If you are not using these features and wish to reduce the size
// of your final executable, you should remove from the following
// the specific initialization routines you do not need.

#ifdef _AFXDLL
Enable3dControls();   // Call this when using MFC in a
shared DLL
#else
Enable3dControlsStatic();   // Call this when linking to MFC
statically
endif CGloveDemoDlg dlg;
m_pMainWnd = &dlg;
int nResponse = dlg.DoModal();
```

```
int x;

FILE *fp = fopen("output.dat","a");
fprintf(fp,"BACKSPACES:");
fprintf(fp,"%d\n",backspace);
fprintf(fp,"END CALIBRATION:");
fprintf(fp,"%f %f %f %f %f\n",lthumb,lfirst,lmiddle,lring,lpinkie);
fprintf(fp,"%f %f %f %f %f\n",rthumb,rfirst,rmiddle,rring,rpinkie);
fclose(fp);

fp = fopen("data.dat","a");
fprintf(fp,"START");
for (x = 0; x < sa; x++)
{
fprintf(fp,"%f %f %f %f %f\n",saved_all[0][x],saved_all[1][x],saved_all[2][x],saved_all[3][x],saved_all[4][x]);
fprintf(fp,"%f %f %f %f %f\n",saved_all[5][x],saved_all[6][x],saved_all[7][x],saved_all[8][x],saved_all[9][x]);
}
fprintf(fp,"END CALIBRATION:");
fclose(fp);

if (nResponse == IDOK)
{
// TODO: Place code here to handle when the dialog is
//  dismissed with OK }
else if (nResponse == IDCANCEL)
{
// TODO: Place code here to handle when the dialog is
//  dismissed with Cancel
// TODO: Place code here to handle when the
dialog is
//  dismissed with OK
}

// Since the dialog has been closed, return FALSE so that we exit the
//  application, rather than start the application's message pump.
return FALSE;
}
```

Page 1 of 13

APPENDIX D

This file contains the bulk of the glove code.

```cpp
// GloveDemoDlg.cpp : implementation file
// include "stdafx.h"
include "GloveDemo.h"
#include "GloveDemoDlg.h"
#include "GloveDriver.h"
#include <conio.h>
#include <time.h>
#include <sys/timeb.h>
#include <windows.h>
#include <winbase.h>
#include "..\Common\Common.h"
#include "globals.h"
#include "finger.h"

//resolver includes
#include "defines.h"
#include "cnt.h"
#include "hash.h"
#include "word_viterbi.h"
#include "asterisk.h"
#include "viterbi.h"
#include "interface.h"

#ifdef _DEBUG
#define new DEBUG_NEW
#undef THIS_FILE
static char THIS_FILE[] = __FILE__;
endif extern struct FINGER_DATA finger_data[NFINGERS];
extern FINGERS correct[MAX_CORRECT],predicted[MAX_CORRECT];
//will be calibrated, if there is a calibration stage
extern double
rfirst,rmiddle,rring,rpinkie,rthumb,lfirst,lmiddle,lring,lpinkie,lthumb;
int sa = 0,pcount = 0,backspace=0;
```

```
double saved_all[10][1000000];

struct FINGER_DATA
{
    MODE mode;
    int start_time;
    int peak_time;
    int finish_time;
    double current;
    double up_amount;
    double down_amount;
    double peak_amount;
    double last;
    double filter_last[NFILTER];
}FINGER_DATA;

struct PRESSES
{
FINGERS finger;
PRESSES *next;
}PRESSES;

struct PRESSES_LIST
{
struct PRESSES *p;
PRESSES_LIST *next;
}PRESSES_LIST;

struct PRESSES *cp;
struct PRESSES_LIST *l,*cl;

/////////////////////////////////////////////////////////////
//////
// CGloveDemoDlg dialog CGloveDemoDlg::CGloveDemoDlg(CWnd* pParent /*=NULL*/)
: CDialog(CGloveDemoDlg::IDD, pParent)
{
//{{AFX_DATA_INIT(CGloveDemoDlg)
// NOTE: the ClassWizard will add member initialization here
//}}AFX_DATA_INIT
// Note that LoadIcon does not require a subsequent DestroyIcon in Win32
m_hIcon = AfxGetApp()->LoadIcon(IDR_MAINFRAME);
} void CGloveDemoDlg::DoDataExchange(CDataExchange* pDX)
{
CDialog::DoDataExchange(pDX);
//{{AFX_DATA_MAP(CGloveDemoDlg)
DDX_Control(pDX, IDC_SENTENCES, m_ctlSentences);
//}}AFX_DATA_MAP
}

BEGIN_MESSAGE_MAP(CGloveDemoDlg, CDialog)
//{{AFX_MSG_MAP(CGloveDemoDlg)
ON_WM_SYSCOMMAND()
ON_WM_PAINT()
```

```
ON_WM_QUERYDRAGICON()
ON_WM_TIMER()
//}}AFX_MSG_MAP
END_MESSAGE_MAP()

/////////////////////////////////////////////////////////////////////////////
/////
// CGloveDemoDlg message handlers BOOL CGloveDemoDlg::OnInitDialog()
{
CDialog::OnInitDialog();

///////////////////////////////////////////////////////////
//for the graphics window
m_Target = ::FindWindow( "Glove Demo","Glove Demo" );
if ( !m_Target )
{
MessageBox( "No source window found", "Not Routing messages",
MB_OK );
return( FALSE );
}
///////////////////////////////////////////////////////////

// Add "About..." menu item to system menu.

// IDM_ABOUTBOX must be in the system command range.
ASSERT((IDM_ABOUTBOX & 0xFFF0) == IDM_ABOUTBOX);
ASSERT(IDM_ABOUTBOX < 0xF000);

CMenu* pSysMenu = GetSystemMenu(FALSE);
CString strAboutMenu;
strAboutMenu.LoadString(IDS_ABOUTBOX);
if (!strAboutMenu.IsEmpty())
{
pSysMenu->AppendMenu(MF_SEPARATOR);
pSysMenu->AppendMenu(MF_STRING, IDM_ABOUTBOX, strAboutMenu);
}

// Set the icon for this dialog.  The framework does this automatically
//  when the application's main window is not a dialog
SetIcon(m_hIcon, TRUE);  // Set big icon
SetIcon(m_hIcon, FALSE); // Set small icon // setup timer to update fields every 100ms
SetTimer(1, 1, NULL);

return TRUE;  // return TRUE  unless you set the focus to a control
} void CGloveDemoDlg::OnSysCommand(UINT nID, LPARAM lParam)
{
if ((nID & 0xFFF0) == IDM_ABOUTBOX)
{
CDialog dlgAbout(IDD_ABOUTBOX);
```

```
dlgAbout.DoModal();
}
else
{
CDialog::OnSysCommand(nID, lParam);
}
}

// If you add a minimize button to your dialog, you will need the code below
//  to draw the icon.  For MFC applications using the document/view model,
//  this is automatically done for you by the framework.

void CGloveDemoDlg::OnPaint()
{
if (IsIconic())
{
CPaintDC dc(this); // device context for painting SendMessage(WM_ICONERASEBKGND, (WPARAM) dc.GetSafeHdc(), 0);

// Center icon in client rectangle
int cxIcon = GetSystemMetrics(SM_CXICON);
int cyIcon = GetSystemMetrics(SM_CYICON);
CRect rect;
GetClientRect(&rect);
int x = (rect.Width() - cxIcon + 1) / 2;
int y = (rect.Height() - cyIcon + 1) / 2;

// Draw the icon
dc.DrawIcon(x, y, m_hIcon);
}
else
{
CDialog::OnPaint();
}
}

// The system calls this to obtain the cursor to display while the user drags
// the minimized window.
HCURSOR CGloveDemoDlg::OnQueryDragIcon()
{
return (HCURSOR) m_hIcon;
} void save_finger (char *saved,int *count,FINGERS prediction)
{
switch(prediction)
{
case LPINKIE:
*(saved + *count) = '5';
break;
case LRING:
*(saved + *count) = '4';
break;
case LMIDDLE:
*(saved + *count) = '3';
break;
```

```
case LFIRST:
*(saved + *count) = '2';
break;
case RFIRST:
*(saved + *count) = '6';
break;
case RMIDDLE:
*(saved + *count) = '7';
break;
case RRING:
*(saved + *count) = '8';
break;
case RPINKIE:
*(saved + *count) = '9';
break;
case RTHUMB:
*(saved + *count) = '*';
break;
default:
*(saved + *count) = '*';
}
*count = *count + 1;
}
void save_finger2 (char *saved,int count,FINGERS prediction)
{
switch(prediction)
{
case LPINKIE:
*(saved + count) = '5';
break;
case LRING:
*(saved + count) = '4';
break;
case LMIDDLE:
*(saved + count) = '3';
break;
case LFIRST:
*(saved + count) = '2';
break;
case RFIRST:
*(saved + count) = '6';
break;
case RMIDDLE:
*(saved + count) = '7';
break;
case RRING:
*(saved + count) = '8';
break;
case RPINKIE:
*(saved + count) = '9';
break;
case RTHUMB:
*(saved + count) = '*';
break;
default:
*(saved + count) = '*';
```

```
}
} int CGloveDemoDlg::GetLastIndex()
{
ASSERT( ( m_ctlSentences.GetCount() >= 0 ) );
return( m_ctlSentences.GetCount() - 1 );

}
void CGloveDemoDlg::ReplaceAtIndex( int i, char* pszSentence )
{
ASSERT( ( m_ctlSentences.GetCount() > i ) && ( i >= 0 ) );
m_ctlSentences.DeleteString( i );
m_ctlSentences.InsertString( i, pszSentence );

} void CGloveDemoDlg::OnTimer(UINT nIDEvent)
{ static char saved[1000];
char temp[1000],string[80];
static int count = 0;
static char *Partial_Sentence = NULL;
char *Sentence;
char *reconstruct(internals *stuff, char *phone,int length);
/*typecast for reconstruct routine*/
static int cal = 0;
int x = 0;
struct PRESSES *p;
struct PRESSES_LIST *cl2;
HAND Hand;
static int last_thumb = 0;
    div_t div_result;
static BOOL no_space = FALSE,mid_word = FALSE;

p = (struct PRESSES *) malloc (sizeof (struct PRESSES));

//still at the calibration stage
if (cal < 1000)
{
SetDlgItemText(IDC_VAL6,"calibrate");
cal++;
}
else
SetDlgItemText(IDC_VAL6,"");

// assume for now we are going to predict by saving how much of a change we are
seeing
// and seeing if it increases and then decreases and vice versa
if (nIDEvent != 1)
return;

//make it so that we can use both gloves at the same time
LPBYTE gloveData1 = GloveGetDataPtr1();
LPBYTE gloveData2 = GloveGetDataPtr2();
```

```
//left
SetDlgItemInt(IDC_VAL1, gloveData2[0]);
SetDlgItemInt(IDC_VAL2, gloveData2[1]);
SetDlgItemInt(IDC_VAL3, gloveData2[2]);
SetDlgItemInt(IDC_VAL4, gloveData2[3]);
SetDlgItemInt(IDC_VAL5, gloveData2[4]);

//right
SetDlgItemInt(IDC_VAL8, gloveData1[4]);
SetDlgItemInt(IDC_VAL9, gloveData1[3]);
SetDlgItemInt(IDC_VAL10, gloveData1[2]);
SetDlgItemInt(IDC_VAL11, gloveData1[1]);
SetDlgItemInt(IDC_VAL12, gloveData1[0]);

finger_data[LPINKIE].current = (double) gloveData2[0];
    finger_data[LRING].current = (double) gloveData2[1];
    finger_data[LMIDDLE].current = (double) gloveData2[2];
    finger_data[LFIRST].current = (double) gloveData2[3];
    finger_data[LTHUMB].current = (double) gloveData2[4];

update(finger_data,IGNORE_RIGHT,p);

finger_data[RPINKIE].current = (double) gloveData1[4];
    finger_data[RRING].current = (double) gloveData1[3];
    finger_data[RMIDDLE].current = (double) gloveData1[2];
    finger_data[RFIRST].current = (double) gloveData1[1];
    finger_data[RTHUMB].current = (double) gloveData1[0];

////////////////////////////////////////////////
// for the graphics window
COPYDATASTRUCT cds;
cds.dwData =  1;
cds.cbData =  sizeof( HAND );
cds.lpData = HeapAlloc( ::GetProcessHeap(), HEAP_ZERO_MEMORY,
cds.cbData );

Hand.lfirst  =  finger_data[LFIRST].current;
Hand.lmiddle =  finger_data[LMIDDLE].current;
Hand.lring   =  finger_data[LRING].current;
Hand.lpinkie =  finger_data[LPINKIE].current;
Hand.lthumb  =  finger_data[LTHUMB].current;
Hand.rfirst  =  finger_data[RFIRST].current;
Hand.rmiddle =  finger_data[RMIDDLE].current;
Hand.rring   =  finger_data[RRING].current;
Hand.rpinkie =  finger_data[RPINKIE].current;
Hand.rthumb  =  finger_data[RTHUMB].current;
memcpy( cds.lpData, &Hand, sizeof( HAND ) );
::SendMessage( m_Target, WM_COPYDATA,
    (WPARAM)HWND((CWnd*)this->GetSafeHwnd()),
 (LPARAM)&cds );
//free the data buffer
::HeapFree( ::GetProcessHeap(),0, cds.lpData );
//////////////////////////////////////////////// if (cal == 1000)
{
```

```
cal++;
//print out the final calibration
FILE *fp = fopen("output.dat","a");
fprintf(fp,"CALIBRATION:");
fprintf(fp,"%f %f %f %f
%f\n",lthumb,lfirst,lmiddle,lring,lpinkie);
fprintf(fp,"%f %f %f %f
%f\n",rthumb,rfirst,rmiddle,rring,rpinkie);
fclose(fp);
l = (struct PRESSES_LIST*) malloc (sizeof
(PRESSES_LIST));
cl = l;
m_ctlSentences.AddString( "" );
} if (cal > 1000)
//saving the data to a file for examination during tests
{
saved_all[0][sa] = finger_data[LFIRST].current;
saved_all[1][sa] = finger_data[LMIDDLE].current;
saved_all[2][sa] = finger_data[LRING].current;
saved_all[3][sa] = finger_data[LPINKIE].current;
saved_all[4][sa] = finger_data[LTHUMB].current;
saved_all[5][sa] = finger_data[RFIRST].current;
saved_all[6][sa] = finger_data[RMIDDLE].current;
saved_all[7][sa] = finger_data[RRING].current;
saved_all[8][sa] = finger_data[RPINKIE].current;
saved_all[9][sa] = finger_data[RTHUMB].current;
sa++;
} if (p->finger == NONE)
update(finger_data,IGNORE_LEFT,p);

//still at the calibration stage
if (cal < 1000)
set_calibration(finger_data);

else if (p->finger != NONE)
{
Beep(0xAF,0xAF);

//just finished a word
if (p->finger == RTHUMB)
{
//we were deleting a completed word
if (mid_word)
{
x = 0;
while (l->p)
{ save_finger(temp,&x,l->p->finger);
l = l->next;
}
temp[x] = '\0';
strcpy(string,saved);
```

```
strcat(string,temp);
Partial_Sentence = reconstruct(&stuff,
string, strlen(string));
ReplaceAtIndex( GetLastIndex(),
Partial_Sentence);
strcpy(saved,string);

}
//we were not doing deletions
else
{
while (l->p)
{
//for now doing just one at a
time save_finger(saved,&count,l->p->finger);
l = l->next;
//reconstruct the incomplete
sentence with the last word in it
saved[count] = '\0';
Partial_Sentence =
reconstruct(&stuff, saved, strlen(saved));
ReplaceAtIndex( GetLastIndex(),
Partial_Sentence);
}
}
free(l);
l = (struct PRESSES_LIST*) malloc (sizeof
(PRESSES_LIST));
cl = l;
no_space = FALSE;
mid_word = FALSE;
}

//try to reconstruct the sentence, we just had a period
//or maybe a backspace if there are two in a row
if (p->finger == LTHUMB)
{
last_thumb++;
//see if there were even number of periods, so
we have a backspace
    div_result = div( last_thumb, 2 );
if (div_result.rem == 0)
{
backspace++;
x = 0;
//middle of a word
if (l->p)
{
cl2 = l;
while (cl2->p)
{
//for now doing just one
at a time
//ignore leading space
if (cl2->p->finger !=
```

```
RTHUMB)
save_finger(temp,&x,cl2->p->finger);
cl = cl2;
cl2 = cl2->next;
}
cl->p = NULL;
//reconstruct the incomplete
word with the last character in it
temp[x-1] = '\0';
if (x == 0)
{
//delete the leading
space
free(l);
l = (struct
PRESSES_LIST*) malloc (sizeof (PRESSES_LIST));
l->p = NULL;
cl = l;
no_space = TRUE;
}
else if (x == 1)
//at the beginning of
the word, and there is just a leading space
ReplaceAtIndex(
GetLastIndex(), reconstruct(&stuff, saved, strlen(saved)));
else
{
Sentence =
reconstruct(&stuff, temp, strlen(temp));
if (Partial_Sentence)
{ strcpy(string,Partial_Sentence);
if (no_space ==
FALSE)

strcat(string," ");
no_space =
FALSE;

strcat(string,Sentence);
}
else strcpy(string,Sentence);
ReplaceAtIndex(
GetLastIndex(), string);
}
}
//else go back to the words we did
already
else
{
if (strlen(saved) > 1)
saved[strlen(saved) - 1]
= '\0';
```

```
Partial_Sentence =
reconstruct(&stuff, saved, strlen(saved));
ReplaceAtIndex( GetLastIndex(),
Partial_Sentence);
mid_word = TRUE;
}

}
}

//just had a character
else
{
div_result = div( last_thumb, 2 );
//odd number of periods = a period!
if (div_result.rem != 0)
{
//we had a period before this current
character
x = 0;
while (l->p)
{
//for now doing just one at a
time save_finger(saved,&count,l->p->finger);
l = l->next;
}
free(l);
l = (struct PRESSES_LIST*) malloc
(sizeof (PRESSES_LIST));
cl = l;
//reconstruct the incomplete sentence
with the last word in it
saved[count] = '\0';
Partial_Sentence = reconstruct(&stuff,
saved, strlen(saved));
ReplaceAtIndex( GetLastIndex(),
Partial_Sentence);
m_ctlSentences.AddString( "" );
Partial_Sentence = NULL;
count = 0;
last_thumb=0;
}

//not at the end of the word, so continue in
list
cl->p = (struct PRESSES *)
malloc(sizeof(PRESSES));
cp = cl->p;
while (p != NULL)
{
cp->finger = p->finger;
if (p->next)
{
cp->next = (struct PRESSES *)
malloc(sizeof(PRESSES));
```

```
cp = cp->next;
}
p = p->next;
}
free(p);
cp->next = NULL;
cl->next = (struct PRESSES_LIST
*)malloc(sizeof(struct PRESSES_LIST));
cl->next->p = NULL;
cl->next->next = NULL;
cl = cl->next;
//redo the last sentence and then add the
characters incomplete
//for the word that we are in the middle of
if (cp->finger != RTHUMB)
{
x = 0;
cl2 = l;
while (cl2->p)
{
//for now doing just one at a
time
//ignore leading space
if (cl2->p->finger != RTHUMB)

save_finger(temp,&x,cl2->p->finger);
cl2 = cl2->next;
}
//reconstruct the incomplete word with
the last character in it
temp[x] = '\0';
if (mid_word)
{
strcpy(string,saved);
strcat(string,temp);
Sentence = reconstruct(&stuff,
string, strlen(string));
ReplaceAtIndex( GetLastIndex(),
Sentence);
}
else
{
Sentence = reconstruct(&stuff,
temp, strlen(temp));
if (Partial_Sentence)
{ strcpy(string,Partial_Sentence);
if (no_space == FALSE)
strcat(string,"
");
strcat(string,Sentence);
}
else
strcpy(string,Sentence);
ReplaceAtIndex( GetLastIndex(),
string);
```

```
}
}
}
}
```

APPENDIX E

Page 1 of 2 does Gaussian filter of the glove data

```c
#include "stdafx.h"

ifdef _DEBUG
#define new DEBUG_NEW
#undef THIS_FILE
static char THIS_FILE[] = __FILE__;
endif include <stdio.h>
include "glove.h"
#include "finger.h"
#include "externs.h"

void convolute(struct FINGER_DATA *f, int m)
{
    int x,y;
    FINGERS start,stop;
    double sum,g;
    int gaussian[NFILTER];
    //FILE *fp;

//fp = fopen("gaussian.out","a");

gaussian[0] = 10; gaussian[1] = 29; gaussian[2] = 58; gaussian[3] = 67;
    gaussian[4] = 58; gaussian[5] = 29; gaussian[6] = 10;

//convolute the right
    if (m == IGNORE_LEFT)
    {
        start = RPINKIE;
        stop =  RTHUMB;
    }
    //convolute the left
    if (m == IGNORE_RIGHT)
    {
        start = LPINKIE;
        stop = LFIRST;
    }
    for (x = start; x <= stop; x++)
    {
        g = 0;sum = 0;
        for (y = 0; y < NFILTER; y++)
        {
            sum += f[x].filter_last[y] * gaussian[y];
```

```
            g += gaussian[y];
        }
        sum = sum / g;
        f[x].filter_last[3] = sum;
        if (sum < 1)
            sum = 0.0;
        f[x].current = sum;
    }
}
void add_filter(struct FINGER_DATA *f, int m)
{
    int x,y;
    FINGERS start,stop;

//convolute the right
    if (m == IGNORE_LEFT)
    {
        start = RPINKIE;
        stop =  RTHUMB;
    }
    if (m == IGNORE_RIGHT)
    {
        start = LPINKIE;
        stop = LFIRST;
    }
    for (x = start; x <= stop; x++)
    {
        for (y = 0; y < (NFILTER-1); y++)
            f[x].filter_last[y] = f[x].filter_last[y+1];
        f[x].filter_last[NFILTER-1] = f[x].current;
    }
    convolute(f,m);
}
```

Appendix F picks the finger if there was a press

```c
#include "stdafx.h"

ifdef _DEBUG
#define new DEBUG_NEW
#undef THIS_FILE
static char THIS_FILE[] = __FILE__;
endif include <stdio.h>
include <stdlib.h>
#include "glove.h"
#include "layout.h"
#include <ctype.h>
#include <math.h>
#include "externs.h"

extern FINGERS correct[MAX_CORRECT],predicted[MAX_CORRECT];
extern double
rfirst,rmiddle,rring,rpinkie,rthumb,lfirst,lmiddle,lring,lpinkie,lthumb;

void init_finger_data(struct FINGER_DATA *f)
{
    int x,y;

for (x = 0 ; x < NFINGERS; x++)
    {
        f[x].start_time = 0;
        f[x].peak_time = 0;
        f[x].finish_time = 0;
        f[x].mode = INCREASING;
        f[x].up_amount = 0.0;
        f[x].down_amount = 0.0;
        f[x].peak_amount = 0.0;
        f[x].last = 0.0;
        for (y = 0; y < NFILTER; y++)
            f[x].filter_last[y] = 0.0;
    }
} void reset_fingers(struct FINGER_DATA *f)
{
    int x;
    for (x = 0 ; x < NFINGERS; x++)
```

```
        {
            f[x].up_amount = 0;
            f[x].down_amount = 0;
        }
}
double get_calibrated(FINGERS f)
{
    switch(f)
    {
    case LTHUMB:
        return(lthumb);
        break;
    case LFIRST:
        return(lfirst);
        break;
    case LMIDDLE:
        return(lmiddle);
        break;
    case LRING:
        return(lring);
        break;
    case LPINKIE:
        return(lpinkie);
        break;
    case RTHUMB:
        return(rthumb);
        break;
    case RFIRST:
        return(rfirst);
        break;
    case RMIDDLE:
        return(rmiddle);
        break;
    case RRING:
        return(rring);
        break;
    case RPINKIE:
        return(rpinkie);
        break;
    case NONE:
        return(lthumb);
        break;
    default:
        return(lthumb);
        break;
    }

}
void recalibrate(FINGERS f)
{
    switch(f)
    {
    case LTHUMB:
        lthumb -= CALIBRATE;
        break;
```

```
        case LFIRST:
            lfirst -= CALIBRATE;
            break;
        case LMIDDLE:
            lmiddle -= CALIBRATE;
            break;
        case LRING:
            lring -= CALIBRATE;
            break;
        case LPINKIE:
            lpinkie -= CALIBRATE;
            break;
        case RTHUMB:
            rthumb -= CALIBRATE;
            break;
        case RFIRST:
            rfirst -= CALIBRATE;
            break;
        case RMIDDLE:
            rmiddle -= CALIBRATE;
            break;
        case RRING:
            rring -= CALIBRATE;
            break;
        case RPINKIE:
            rpinkie -= CALIBRATE;
            break;
        case NONE:
            break;
        default:
            break;
        }
} void check_hit(struct FINGER_DATA *f,FINGERS x,struct PRESSES *p)
{
    FINGERS ret_val[NFINGERS],start,stop;
int loop,count = 0;
double greatest = 0;
struct PRESSES *cp;

//loop through the fingers, checking all pairs on a hand to see
//if another finger was moving too
if ((x >= RPINKIE) && (x <= RTHUMB))
    {
        start = RPINKIE;
        stop =  RTHUMB;
    }
    else
    {
        start = LPINKIE;
        stop = LTHUMB;
    } for (loop = (int)start; loop <= (int)stop; loop++)
```

```c
{
//there is a hit
if (f[loop].up_amount >= get_calibrated((FINGERS)loop))
ret_val[count++] = (FINGERS)loop;
}

//there was no hit to speak of
if (count == 0)
{
//dynamically calibrating
    if (f[x].up_amount >= (get_calibrated((FINGERS)x) - CALIBRATE) )
{
recalibrate(x);

p->finger = x;
p->next = NULL;
f[x].up_amount = 0;
return;
}
else
return;
}

//a good hit! best case scenario
else if ((count == 1) && (ret_val[0] == x))
{
p->finger = x;
p->next = NULL;
f[x].up_amount = 0;
return;
} else if (count == 1)
return;

//now is the most tricky part, there is more than one that we found
else
{
cp = p;
for (loop = 0; loop < count; loop++)
{
cp->finger = ret_val[loop];
if (loop != (count - 1))
{
cp->next = (struct PRESSES *) malloc (sizeof
(struct PRESSES));
cp = cp->next;
}
else
cp->next = NULL;

if (loop != x)
{
f[ret_val[loop]].up_amount = 0;
f[ret_val[loop]].down_amount = 0;
}
}
```

```
}
}
void update(struct FINGER_DATA *f, MODE m,struct PRESSES *p)
{
    int x;
    FINGERS start, stop ;
    static int hit_time = 0,all_time = 0,time,ltime = 0,rtime=0;
    FINGERS hit = NONE;

p->finger = NONE;
p->next = NULL;

add_filter(f,m);
    if (m == IGNORE_LEFT)
    {
        start = RPINKIE;
        stop =  RTHUMB;
        time = rtime++;
    }
    if (m == IGNORE_RIGHT)
    {
        start = LPINKIE;
        stop = LTHUMB;
        time = ltime++;
    } all_time++;
for (x = (int)start; x <= (int)stop; x++)
    {
        //increasing
        if (f[x].current > f[x].last)
        {
            // if we need to change the mode, we were decreasing and now
increasing immediately
            if (f[x].mode != INCREASING)
            {
                f[x].mode = INCREASING;
                f[x].up_amount = f[x].current - f[x].last;
                f[x].start_time = time;
            }
            else
                f[x].up_amount += f[x].current - f[x].last;
        }

//decreasing
        else if (f[x].current < f[x].last)
        {
            // if we need to change the mode, we were increasing and now
decreasing
            if (f[x].mode != DECREASING)
            {
                if (p->finger == NONE)
check_hit(f,(FINGERS)x,p);
                f[x].mode = DECREASING;
                f[x].peak_amount = f[x].last;
```

```
            f[x].peak_time = time;
            f[x].down_amount = f[x].last - f[x].current;
        }
        else
            f[x].down_amount += f[x].last - f[x].current;
    } if ((f[x].current == f[x].last) && (f[x].mode == INCREASING))
        f[x].start_time = time;

if ((f[x].current != f[x].last) && (f[x].mode == DECREASING))
        f[x].finish_time = time;

} for (x = start; x <= stop ; x++)
    f[x].last = f[x].current;
if (all_time - hit_time < HIT_INTERVAL)
p->finger = NONE;

if (p->finger != NONE)
    hit_time++;
}
```

Page 1 of 3

APPENDIX G initializes dictionary and has the main reconstruction
routine (called reconstruct)

```c
#include "stdafx.h"

ifdef _DEBUG
#define new DEBUG_NEW
#undef THIS_FILE
static char THIS_FILE[] = __FILE__;
endif include <stdio.h>
include <stdlib.h>
#include <string.h>
#include <ctype.h>
include "defines.h"
#include "cnt.h"
#include "hash.h"
#include <time.h>
#include <sys/types.h>
#include <sys/timeb.h>
#include "word_viterbi.h"
#include "asterisk.h"
#include "viterbi.h"
#include "lookup.h"
#include "interface.h"

extern CODENODE *PERIOD;
extern int phone;
extern int test;

void myread(char *argv);

void initialize(internals *stuff)
{ myread("key2.inf");

stuff->Dict = HASH_ReadTable();

stuff->Prefix = CNT_Read("prefix.dat");
  stuff->Suffix = CNT_Read("suffix.dat");

TAG_ReadTable(&stuff->TagTable);
```

```
/* if we know that we have a phone then we know the Q ans Z are the same as
space */
  if (phone == TRUE)
  stuff-> AstTable = AST_ReadTable();

stuff-> Tri = TRI_ReadTable();

stuff-> AstState = AST_Create(0);
  PERIOD = HASH_FindCode(stuff->Dict,"#");

}

/* This is the one entry point to call with a string of digits to
return the interpreted string of characters.
*/ char *reconstruct(internals *stuff, char *phone,int length)
{
    Token *t; /*token list for disposal*/ int i; /*counter*/
    int start_char; /*position of sentence start*/
    char *full_buffer; /*buffer for whole text*/
    char *sentence; /*pointer to reconstructed sentence*/
    char *phonestring;

full_buffer = (char *) malloc(2 * (length+2));
    phonestring = full_buffer + length + 2;
    memcpy(phonestring, phone, length);
    phonestring[length] = 0;
    start_char = 0;

for (i=0; i < length; i++) {
  if ((phonestring[i] == '#') || (i == (length-1))) { sentence = viterbi(
LookupSentence(
t=AST_ExtractWords(
phonestring + start_char,
stuff->AstTable,
stuff->AstState
),
stuff->Dict,
stuff->Prefix,
stuff->Suffix,
stuff->Tri
),
&stuff->TagTable
);

free_token_list(t);
strcpy(full_buffer+start_char,sentence);
/*if (start_char > 0)
full_buffer[start_char-1] = '.';*/
free(sentence);
```

```
        start_char = i+1;
}
    }
  return(full_buffer);
}
```

7/30/99

Appendix H how to specify a keyboard layout to the program
(this one is the phone)

number of digits
10
max number on a key
3
number of repeats
1
dial
A B C D E F G H I J K L M N O P Q R S T U V W X Y Z .
2 2 2 3 3 3 4 4 4 5 5 5 6 6 6 7 * 7 7 8
8 8 9 9 9 * #
invdial
a b c
d e f
g h i
j k l
m n o
p r s
t u v
w x y
q z *
.
pos
A B C D E F G H I J K L M N O P Q R S T U V W X Y Z .
1 2 3 1 2 3 1 2 3 1 2 3 1 2 3 1 1 2 3 1
2 3 1 2 3 2 1 1
prob
.6334 .1191 .2476
.2023 .6703 .1234
.1318 .3620 .5063
.0391 .1247 .8362
.1484 .4125 .4390
.1363 .4194 .4443
.7143 .2054 .0803
.4853 .0521 .4625
.0054 .0048 .9898
1   1   1

7/30/99

APPENDIX I various reconstruction routines

```c
#ifndef PHONE_HDR
define PHONE_HDR include "stdafx.h"

ifdef _DEBUG
#define new DEBUG_NEW
#undef THIS_FILE
static char THIS_FILE[] = __FILE__;
endif include <ctype.h>
include "defines.h"
#include "hash.h"
#include <stdlib.h>
#include <string.h>
#include "phone.h"

void insert_code_into_table2(char *code,CODETABLE *t,WORDNODE *item);

/*    Given a character, compute what its digit code is.
      What is returned is an integer between 0 and num_digits.
*/ char todial(char c)
{
  if (isalpha(c)) {
    if (!islower(c))
      c=tolower(c);
    /* Using the phone */
    if ((phone == TRUE) &&((c == 'q' || c == 'z')))
      return(num_digits-2);
    /* More than the ten characters, then we have to use special ones */
    if (num_digits > 10)
    {
      if (dial[c-'a'] == '^')
         return (num_digits - 3);
      else if (dial[c - 'a'] == '&')
      return (num_digits - 4);
      else if (dial[c - 'a'] == '%')
         return (num_digits - 5);
      else if (dial[c - 'a'] == '@')
         return (num_digits - 6);
      else if (dial[c - 'a'] == '(')
```

7/30/99

```
      return (num_digits - 7);
        else if (dial[c - 'a'] == ')')
          return (num_digits - 8);
        else if (dial[c - 'a'] == '$')
          return (num_digits - 9);
      else
       return(dial[c-'a']-'2');
      }
      else
       return(dial[c-'a']-'2');
    }
    else
     if (c == '.' || c == '?' || c == '!') return(num_digits-1);
    else    /*probably blank*/
       return(num_digits-2);
} char todial2(char c,int x)
{
 if (isalpha(c)) {
   if (!islower(c))
     c=tolower(c);
   /* Using the phone */
   if ((phone == TRUE) &&((c == 'q' || c == 'z')))
     return(num_digits-2);
   /* More than the ten characters, then we have to use special ones */
   if (num_digits > 10)
    {
      if (dial[(c - 'a') + (x * NCHAR)]  == '^')
         return (num_digits - 3);
        else if (dial[(c - 'a') + (x * NCHAR)]  == '&')
          return (num_digits - 4);
        else if (dial[(c - 'a') + (x * NCHAR)]  == '%')
          return (num_digits - 5);
        else if (dial[(c - 'a') + (x * NCHAR)]  == '@')
          return (num_digits - 6);
        else if (dial[(c - 'a') + (x * NCHAR)]  == '(')
          return (num_digits - 7);
        else if (dial[(c - 'a') + (x * NCHAR)]  == ')')
          return (num_digits - 8);
        else if (dial[(c - 'a') + (x * NCHAR)]  == '$')
          return (num_digits - 9);

else
         return(dial[(c - 'a') + (x * NCHAR)] -'2');
    }
    else
     return(dial[(c - 'a') + (x * NCHAR)] - '2');
   }
   else
    if (c == '.' || c == '?' || c == '!') return(num_digits-1);
   else    /*probably blank*/
     return(num_digits-2);
}
  /*    Given a character, compute what its digit code is.
        What is returned is an ascii character '2'-'9', '*', or '#'
```

```
*/
char todialchar(char c)
{
  if (isalpha(c)) {
    if (!islower(c))
       c=tolower(c);
       return(dial[c-'a']);
  }
  else
    if (c == '.' || c == '?' || c == '!') return('#');
  else    /*probably blank*/
    return('*');
}

/*  Given an input string, return a pointer to a new string
which is translated into digit codes.
*/ char *stringtodial(char *str)
{
char *dialed, *start; /*dialed string*/
char printdial(int d);

start = dialed = (char *) malloc(strlen(str)+1);

while (*str != '\0') {
*dialed = printdial(todial(*str));
dialed++;
str++;
}

*dialed = '\0';

return(start);
}

/* This string to dial is for when we have repeats and we are inserting
into the dictionary */
void stringtodial2(char *final, char *word, int pos, CODETABLE *t,int count,int
tag,WORDNODE *item)
{
int x;
char c;
char printdial(int d);
WORDNODE *new_word;

if (*(word+pos) == '\0')
    {
        final[pos] = '\0';
        new_word = MakeWORDNODE(word,count,tag);
/*while (item->list)
        {
Bigram =
create_bigram(item->list->key,item->list->tag,item->list->count);
        Bigram->list = new_word->list;
```

```
                new_word->list = Bigram;
item->list = item->list->list;
        }*/
        new_word->list = item->list;
        insert_code_into_table2(final,t,new_word);
    }
else
{
if (!islower(*(word+pos)))
    c=tolower(*(word+pos));
for (x = 0; x < repeats ; x++)
{
/* there is an actual position */
            if (dial[(c - 'a') + (x * NCHAR)] != '0')
{
                final[pos] = printdial(todial2(c,x));

stringtodial2(final,word,pos+1,t,count,tag,item);
}
}
}
}

/*      Given a character, compute what its position on the given
        phone button is. What is returned is an integer between 0
        and key_count-1.
*/ int topos(char c)
{
  if (isalpha(c)) {
    if (islower(c) == 0) {
      c=tolower(c);
    }
    return(pos[c-'a']-1);
  }
  else   /*probably blank or period*/
    return(key_count-1);
}

/*      Given a number between 0 and num_digits-1, returns the Ascii
        character '2'-'9' ,'*' or '#' of the phone key it represents.

*/ char printdial(int d)
                /*number from 0 to num_digits-1 */
{
    if (num_digits > 10)
        {
    if ((num_digits > 10) && (d == num_digits -3))
        return '^';
        else if ((num_digits > 11) && (d == num_digits - 4))
            return '&';
```

```
            else if ((num_digits > 12) && (d == num_digits - 5))
                return '%';
            else if ((num_digits > 13) && (d == num_digits - 6))
                return '!';
            else if ((num_digits > 14) && (d == num_digits - 6))
                return '@';
            else if ((num_digits > 15) && (d == num_digits - 7))
                return '(';
            else if ((num_digits > 16) && (d == num_digits - 8))
                return ')';
            else if ((num_digits > 17) && (d == num_digits - 9))
                return '$';

}
        if (d < num_digits-2)
            return('2' + d);
        else if (d == num_digits-1)
    return '#';
else
    return('*');
}

/*      Given an Ascii character '2'-'9', '#' or '*', return the number
        between 0 and num_digits which it represents.
*/ int readdial(char c)
                /*character '2'-'9', '#' or '*' */
{
        if ((c >= '2') && (c <= '9'))
             return(c-'2');
        else
    if (c == '#') return num_digits-1;
else if (num_digits > 10)
        {
            if (c == '^')
              return num_digits - 3;
            if (c == '&')
              return num_digits - 4;
            if (c == '%')
              return num_digits - 5;
            if (c == '!')
              return num_digits - 6;
            if (c == '@')
              return num_digits - 7;
            if (c == '(')
              return num_digits -8;
            if (c == ')')
              return num_digits - 9;
            if (c == '$')
              return num_digits - 10;
             else
              return num_digits - 2;
        }
        else
```

```
  return(num_digits-2);
}
```

What is claimed is:

1. A method for entering text in a virtual reality apparatus, said apparatus having at least one sensor glove which includes a plurality of fingers, said glove being utilized to input position data, comprising the steps of:

loading and initializing a dictionary;

specifying a key that represents at least one character for each finger press movement;

calibrating the at least one glove by establishing threshold values through a user inputting a sample sequence, said threshold values indicating an occurrence of a finger press;

monitoring the positions of the plurality of the fingers by the at least one sensor glove;

determining if a finger press was intended when at least one finger passes a threshold;

providing feedback to the user to indicate that a key was entered when there is a finger press;

when there is a finger press, storing the key of that finger;

after storing the key of that finger, separating key words by recognizing spaces in the stored sequence of keys, matching the key words with one or more words in the dictionary, generating all possible permutations of word sequences, and selecting the most probable word sequence or partial sentence;

when a partial sentence is selected, generating feedback to the user concerning the selected partial sentence;

returning to said monitoring step; and if the user indicates the end of a sentence, erasing the stored sequence of keys, storing the last most probable word sequence as a sentence, and returning to said monitoring step.

2. The method of claim 1, wherein said loading and initializing the dictionary comprises the steps of:

converting each word of the dictionary into its key equivalent; and storing each word in a searchable data structure by its key equivalent.

3. The method of claim 2, wherein said searchable data structure is a trie.

4. The method of claim 1, wherein said monitoring step comprises the sub-steps of:

determining if any finger has passed the threshold;

determining if any finger has passed the threshold minus a constant;

if at least one finger has passed the threshold minus a constant, replacing the current threshold with the value of the current threshold minus the constant; and returning to said determining step.

5. The method of claim 1, wherein said determining step comprises the sub-steps of:

determining if only one finger passed the threshold;

if more than one finger passed the threshold, choosing the finger value closest to the threshold for the intended key; and if only one finger passed the threshold, choosing that finger as the intended key.

6. The method of claim 1, wherein said dictionary has frequency probabilities associated with each word and said matching the key words with one or more words in the dictionary comprises:

searching the data structure for all matches with the key word;

if there is no match, searching for partial word matches;

if there is no partial word match, searching for prefix/suffix matches; and if there is no prefix/suffix match, constructing a word using character probabilities and letter transition probabilities.

7. The method of claim 1, wherein said selecting the most probable word sequence or partial sentence uses the Viterbi algorithm, grammatical constraints, and word-pair frequency to assign probabilities to each partial sentence.

8. The method of claim 1, wherein said text is Chinese symbols and said keys are phonetic symbols.

9. The method of claim 1, wherein said step of specifying a key is determined statistically or ergonomically.

10. The method of claim 1, wherein said feedback is audio or visual.

11. The method of claim 1, wherein said feedback is tactile.

12. The method of claim 1, wherein said position data is generated by cameras, sensor rings, or headgear.

* * * * *

UNITED STATES PATENT AND TRADEMARK OFFICE
CERTIFICATE OF CORRECTION

PATENT NO.   : 6,407,679 B1  Page 1 of 1
DATED        : June 18, 2002
INVENTOR(S)  : Francine Evans, Steven Skiena and Amitabh Varshney It is certified that error appears in the above-identified patent and that said Letters Patent is hereby corrected as shown below:

<u>Column 1,</u>
Line 12, the following statement is added as the second paragraph of the specification:

-- The U.S. Government has certain rights in this invention pursuant to Grant No.: CCR 9502239 awarded by the National Science Foundation. --

Signed and Sealed this

Twentieth Day of August, 2002

Attest:

JAMES E. ROGAN
Attesting Officer  Director of the United States Patent and Trademark Office